(12) United States Patent
Davis et al.

(10) Patent No.: US 8,322,608 B2
(45) Date of Patent: Dec. 4, 2012

(54) USING PROMISCUOUS AND NON-PROMISCUOUS DATA TO VERIFY CARD AND READER IDENTITY

(75) Inventors: Michael L. Davis, Amherst, NY (US); Tam Hulusi, Santa Ana, CA (US)

(73) Assignee: Assa Abloy AB (SE)

( * ) Notice: Subject to any disclaimer, the term of this patent is extended or adjusted under 35 U.S.C. 154(b) by 1031 days.

(21) Appl. No.: 11/464,280

(22) Filed: Aug. 14, 2006

(65) Prior Publication Data
US 2007/0034691 A1  Feb. 15, 2007

Related U.S. Application Data

(60) Provisional application No. 60/708,550, filed on Aug. 15, 2005.

(51) Int. Cl.
*G06K 5/00* (2006.01)
(52) U.S. Cl. ............... 235/382; 235/380; 235/382.5; 235/491
(58) Field of Classification Search ............... 235/379, 235/380, 492; 340/10.1, 10.4, 10.41, 10.5
See application file for complete search history.

(56) References Cited

U.S. PATENT DOCUMENTS

| | | | |
|---|---|---|---|
| 5,499,017 A | | 3/1996 | Beigel |
| 5,698,836 A | * | 12/1997 | Fujioka ................... 235/492 |
| 5,764,138 A | | 6/1998 | Lowe |
| 5,832,090 A | | 11/1998 | Raspotnik |
| 6,094,724 A | * | 7/2000 | Benhammou et al. ......... 726/20 |
| 6,476,708 B1 | | 11/2002 | Johnson |
| 6,566,997 B1 | | 5/2003 | Bradin |
| 6,611,198 B1 | * | 8/2003 | Geiszler et al. ............ 340/10.41 |
| 6,650,227 B1 | | 11/2003 | Bradin |
| 6,729,550 B2 | * | 5/2004 | Seita et al. .................... 235/492 |
| 7,009,517 B2 | | 3/2006 | Wood |
| 7,108,177 B2 | | 9/2006 | Brookner |
| 7,512,236 B1 | * | 3/2009 | Zhu ............................ 380/255 |
| 2002/0170973 A1 | | 11/2002 | Teraura |
| 2004/0025035 A1 | * | 2/2004 | Jean-Claude et al. ......... 713/189 |
| 2005/0236479 A1 | | 10/2005 | Schmidtberg et al. |
| 2007/0034686 A1 | | 2/2007 | Davis |

FOREIGN PATENT DOCUMENTS

| | | |
|---|---|---|
| EP | 1460573 | 9/2004 |
| WO | WO 03/081787 | 10/2003 |
| WO | WO 03/817087 | 10/2003 |

OTHER PUBLICATIONS

Notice of Allowance for U.S. Appl. No. 11/464,267 dated Jun. 5, 2008.
Examiner's First Report for Australian Patent Application No. 2006203515, mailed Sep. 30, 2008.
EP Search Report and Written Opinion for EP 06119042.7 dated Dec. 21, 2006.
EP Examination Report for EP 06119045.0, dated Oct. 29, 2007.

(Continued)

*Primary Examiner* — Kristy A Haupt
(74) *Attorney, Agent, or Firm* — Sheridan Ross P.C.

(57) ABSTRACT

A system and method for authenticating radio frequency identification (RFID) devices and validating readers of the RFID devices are disclosed. Embodiments of the invention use RFID devices adapted for storing data in a form of data segments selectively associated with promiscuous and non-promiscuous regions of their memories and monitor algorithmic, computational, communicational, or tampered errors of the readers.

30 Claims, 5 Drawing Sheets

OTHER PUBLICATIONS

EP Examination Report for EP 06119042.7, dated Nov. 14, 2007.
Official Action for U.S. Appl. No. 11/464,267, dated Jan. 15, 2008.
Weis et al, Security and Privacy Aspects of Low-Cost Radio Frequency Identification Systems, Lecture Notes in Computer Science, Springer Verlag, Berlin, DE, vol. 2802, Jan. 2004, 12 pages.
European Search Report for European Application No. 06 11 9045, Nov. 30, 2006, 2 pages.
European Written Opinion for European Application No. 06 11 9045, Nov. 30, 2006, 4 pages.
Lu, Card Convenience, Security Examined, The Tech, Feb. 2, 1996, pp. 12-17, vol. 116, No. 0.
Committee Report, Prox Card Committee, retrieved from http://proxcard.csail.mit.edu/moin.cgi/Committee_20Report_20_2d_20June_202004 on Apr. 30, 2005, 2 pages, Jun. 2004.
CSAIL Prox Card Privacy Committee, Jul. 7, 2004 Status Report, retrieved from http://proxcard.csail.mit.edu/learnmore on Apr. 30, 2005, 5 pages, Jul. 7, 2004.
He, Issues Raised About Building 32 Security, The Tech, Apr. 2, 2004, 3 pages, vol. 124, No. 16.
Agrawal et al., The MIT Card System: Analysis and Recommendations, retrieved from http://swiss.csail.mit.edu/6805/student-papers/fall04-papers/mit_id/ on Apr. 30, 2005, 59 pages, Dec. 10, 2004.
Mandel et al., MIT Proximity Card Vulnerabilities, CSAIL Radio Society, 2004, 22 pages.
Baker, Authentication Comments, retrieved from http://jis.mit.edu/pipermail/saag/2005q1.txt on Apr. 21, 2005, Jan. 8, 2005, 4 pages.
Replay Attacks Newsgroup Listing, RFID Tags and XOR, Google Groups, retrieved from http://groups.google.com/group/sci.crypt/browse_t...94b/5a9623e60aa72a76?q=rfid+replay+attack&rnum=1&hl=en on Apr. 21, 2005, Jun. 1, 2004, 12 pages.
Housley, Emails Related to "Auto, Gas Security Chips Vulnerable, Study Finds", retrieved from http://jis.mit.edu/pipermail/saag/2005q1.txt on Apr. 21, 2005, Jan. 29, 2005, 10 pages, Washington.
Juels et al., Client Puzzles—A Cryptographic Countermeasure Against Connection Depletion Attacks, RSA Laboratories, Proceedings of NDSS '99 (Networks and Distributed Security Systems), pp. 151-165, 1999.
Decker et al., eSeal—A System for Enhanced Electronic Assertion of Authenticity and Integrity, Pervasive 2004. International conference No. 2, Linz, Apr. 18, 2004, vol. 3001, pp. 254-268.
Shamir, How to Share a Secret, MIT, Communications of the ACM, Nov. 1979, 2 pages, vol. 12, No. 11.
El-Chammas et al., Implementing Security in RFID Systems, The "Tag Emulator", American University of Beirut, May 2004, 4 pages.
Datta, RFID an Incomplete Story, MIT Forum for Supply Chain Innovation, 2001, 37 pages.
Waters et al., New Client Puzzle Outsourcing Techniques for DoS Resistance, CCS, Oct. 25-29, 2004, 11 pages, Washington D.C.
Open Security Exchange Best Practices, Guidelines for Selection and Issuance of Identification Tokens for Logical and Physical Systems, 2004, 54 pages.
Molnar et al., Privacy and Security in Library RFID Issues, Practices, and Architectures, CCS, Oct. 25-29, 2004, 10 pages, Washington D.C.
Gragg, Radio Frequency Identification, Technical and Societal Issues, Ohio State University, Dec. 10, 2003, 27 pages.
Inoue et al., RFID Privacy Using User-Controlled Uniqueness, System LSI Research Center, Kyushu University, 2003, 17 pages.
Avoine et al., RFID Traceability: A Multilayer Problem, The 9th International Conference on Financial Cryptography, Feb. 28-Mar. 3, 2005, 15 pages.
Krawczyk, Secret Sharing Made Short, Advances in Cryptography, CRYPTO '93, LNCS 773, 1994, pp. 136-146.
Weis, Security and Privacy in RFID Devices, MIT, May 9, 2003, 79 pages.
Smith et al., Sensor Enhanced Authentication Token for Dynamic Identity Management, HP Laboratories, HPL-2004-226, Dec. 21, 2004, 14 pages.
Krishna et al., Simple Lightweight RFID Reader Protocol, Reva Systems, Mar. 2005, 79 pages.
Anderson et al., Tamper Resistance—A Cautionary Note, USENIX Association in the Second USENIX Workshop on Electronic Commerce Proceedings, Oakland, California, Nov. 18-21, 1996, pp. 1-11.
Brainard et al., A New Two-Server Approach for Authentication with Short Secrets, RSA Laboratories, in V. Paxson, ed., USENIX Security '03, pp. 201-214. 2003.
Official Action for European Patent Application No. 06119042.7, dated Feb. 21, 2012 3 pages.

* cited by examiner

“USING PROMISCUOUS AND
NON-PROMISCUOUS DATA TO VERIFY
CARD AND READER IDENTITY”

CROSS-REFERENCE TO RELATED
APPLICATIONS

This application claims benefit of U.S. provisional patent application Ser. No. 60/708,550 filed Aug. 15, 2005, which is herein incorporated by this reference. Cross-reference is made to U.S. patent application Ser. No. 11/464,267, filed Aug. 14, 2006, entitled "Protection of Non-Promiscuous Data in an RFID Transponder", which is herein incorporated by this reference.

FIELD OF THE INVENTION

Embodiments of the present invention generally relate to a field of radio frequency information acquisition technologies and, in particular, to systems and methods for authenticating radio frequency identification devices and validating RF interrogators of such devices.

BACKGROUND OF THE INVENTION

Radio frequency (RF) identification systems use contactless information acquisition technologies to identify objects at a distance and out of a line of sight. Such systems generally comprise RF transponders ("radio frequency identification" (RFID) devices, RF interrogators ("readers") of the RFID devices, and a controller with a computerized database. The RFID devices typically are incorporated in credit card-like plastic enclosures (e.g., smart cards, ID/access cards, and the like) or directly attached, in a form of RF tags, to the products being monitored or packages thereof. In operation, the RFID device is presented to a reader that reads data from the RFID device, transmits the data to a controller or host system, where a decision is made to grant or deny access to an asset, such as a secure location or some sort of device like a computer. The controller may be centralized and communicate with a plurality of readers or it may be localized and associated with a single reader. The latter is referred to as a stand-alone reader.

In the present state-of-the-art, cards contain data that is promiscuously transmitted when it is excited by being in close proximity to the reader. The data is transmitted from the first memory location in the card and continues with the next sequential memory location until a preprogrammed upper limit is reached. This process repeats continuously restarting at the first memory location after the upper limit has been reached until the card is removed from the reader's RF field. The reader receives and stores multiple continuous transmissions and looks for a synchronization sentinel indicating where the data begins. It then makes sure that a minimum number of identical instances of the data are present to insure that there have been no data reception errors. The data is then formatted and transmitted via a communications port to an upstream device for processing and interpretation of the data. As previously noted, the upstream device may be a remote controller, such as a control panel or host computer, or it may be localized with the reader.

A format is a container for the data that defines its content and size. The supplier and user of the access control system chooses which format is the most suitable based upon the desired data content as well as considerations for security of the data. Due to historical and legacy considerations, the number of bits utilized in formats typically range from 26 to 40 bits, although persons of skill in the art will recognize that the number of bits may exceed 40. Formats that are popular, such as the "26-bit Wiegand format" are less secure than formats that contain a larger number of data bits due to the fact that with a relatively few number of bits, the possibility of finding identical cards in a large world-wide card population for a given format is statistically very likely.

In one specific application, the RFID devices are used in automated security systems providing controlled access to (or exit from) areas, such as offices, public or commercial buildings, and the like. In this and similar applications, integrity of an automated security system may be compromised by attackers eavesdropping RF communications between the RFID device and the reader and cloning a legitimate RFID device, as well as electronically or otherwise tampering with the reader or replacing the reader with a fraudulent device.

RFID cards have become a very mature, reliable, convenient, and popular technology and, as a result, a large installed base of older cards and readers exists (legacy cards and readers). Adding or updating security in older systems such as these can be difficult, expensive, and time consuming. What used to be state of the art security technology twenty or even ten years ago is becoming outdated and less secure.

Conventional systems have several weaknesses that can be exploited since no authentication of the card is performed. Such weaknesses include, substitution of a legitimate reader with an unauthorized reader, substitution of a bona-fide card with a clone, reading a card programmed by an illicit source, and reading a card programmed by an unscrupulous or even low cost supplier that does not have the same quality and security measures therein. Additionally, RFID cards that promiscuously emit unchanging or static data are subject to replay attacks in which a device pretends to be a legitimate reader in order to acquire the promiscuous data. An attacker only needs to read the RFID cards of a passerby or simply borrow a legitimate user's card to harvest data from it for later re-use.

While there is a constant trend of increased sophistication in attempts to compromise the security systems, the high cost of replacing a network of existing readers with more advanced RF interrogators may delay the response to detected and anticipated security threats or violations. Such existing readers or systems may be referred to as legacy readers or systems. They typically are not state of the art in their functionality and features.

Ultimately, legacy readers, systems, cards, and protocols need to be replaced or updated with newer more secure identification and/or security systems. As noted above, this transition can be a very expensive process, especially when a large installed base of legacy readers and cards exists. For example, in the event that a large entity wishes to update their security system, immediate replacement of thousands of readers and security credentials would be impossible. Even if the transition were performed over the course of a week, that week would provide a window where potential attackers could gain unauthorized access to previously secured assets. There are also other entities that do not wish to completely update their entire security systems at once. These entities require a technology that can work according to both the old legacy system protocols and the new system protocols.

There is also a threat that older attacking methods may be used to gain illicit access to assets in an updated system. Both fully updated systems and partially updated systems are still susceptible to the old methods employed by attackers to gain access or information from security systems. For example, attackers may attempt to use older legacy readers in order to recover promiscuously transmitted information from genuine access cards. The promiscuous data may be stolen from a legacy card and placed on an illicit card or portable electronic emulation device. An attacker then only has to present the illicit card to a remote reader that has not been updated and the reader cannot tell the difference between the illicit card and the genuine card because each contains the same data. Also, attackers may attempt to replace or bypass the new reader with a legacy reader by tapping into the communication lines between the reader and the controller.

Therefore, there is a need in the art for an improved system and method for authenticating the RFID devices and validating the readers of the RFID devices, especially during, or after completion of, an upgrade of technology in identification systems.

SUMMARY

The present invention generally is a system and method for authenticating RFID devices (e.g., ID/access cards, smart cards, RF tags, and the like) and/or validating readers of the RFID devices. The invention may be used in various applications utilizing RF information acquisition technologies for identifying a holder (individual or object) of the RFID device.

In one aspect of the invention, a system is provided comprising a host controller or computer and pluralities of RFID devices and readers thereof where a reader, alone or in a combination with the host, is adapted for authenticating an RFID device. Each RFID device has a memory comprising promiscuous and non-promiscuous regions. Commonly formatted information including at least one of manufacturer data, configuration data, and other general data are stored on the promiscuous memory region in a form of data segment(s). Whereas, on the non-promiscuous memory region, "shared-secrets" or "shared-secret data" such as cryptograms, keys, and the like is stored in the form of data segment(s). Shared-secrets are generally any type of data that can be used to prove the authenticity of a card to a reader or other authenticating device.

As used herein, "configuration data" is any data that is related to the configuration of, or communication protocol between, the RFID device and/or the reader For example, configuration data can include data that tells the card what type of information should be transmitted back to the reader when queried by a reader. Additionally, configuration data may include information that relates to the number of memory spaces available and their respective size on a given RFID device. Furthermore, the configuration data may also indicate how many of those memory spaces contain data and what portion of memory they are associated with (e.g., promiscuous or nonpromiscuous). Configuration data may also be related to the number of allowable bits per message that can be sent in a given transmission. The configuration data may be general, in which case it can be stored in the promiscuous region of the memory. However, if portions of the configuration data are not general, those portions are stored in the non-promiscuous region of the memory.

In contrast, "shared-secret data" is data that is specifically required by at least one reader to verify the authenticity of the RFID device. Shared-secret data may include card identification numbers, passwords, keys, encryption/decryption schemes, cryptograms, rolling codes, hashes, and the like. Since shared-secret data is typically unique, it is stored on the non-promiscuous data region.

Data stored in a promiscuous region ("promiscuous data") is transmitted to an interrogating reader when the RFID device is placed in an active zone of the reader, whereas a content of the data segment(s) stored in a non-promiscuous region ("non-promiscuous data") is selectively transmitted to the reader upon a specific request initiated by the reader ("shared-secret data"). Generation and execution of the request require successful decoding and validation of generic data contained in the promiscuous region of the memory. After this process has occurred, and either generic promiscuous data or no promiscuous data is detected, challenges are presented to the RFID device and the RFID device authenticates itself by correctly responding to the challenge by transmitting the appropriate non-promiscuous data segments. After the authenticity of the card is determined (e.g., a determination is made whether the RFID device is valid or not) the authentication or shared-secret data can be transmitted by the reader to the upstream device. The host computer is coupled to the readers and contains a database of records associated with the RFID devices and the readers. Using selective monitoring of communications between the RFID device and the reader, the host computer can assess the validity of an RFID device and/or the reader.

In accordance with embodiments of the present invention, an RFID device is provided whose memory comprises a promiscuous and non-promiscuous memory region. The data stored on the promiscuous memory region is generally generic data, whereas data stored on the non-promiscuous region may be generic (e.g., manufacturer data, configuration data, and the like) and/or non-generic data (e.g., shared-secret data, user data, authenticating data, additional configuration data, and so on).

In accordance with one embodiment, the non-promiscuous region may be further divided into public and private sections. The public section of the non-promiscuous memory region contains data that is not password protected but is not freely emitted. Data on the public section of the non-promiscuous memory region must be requested such as by a challenge, for example.

As used herein, a "challenge" is understood as a request to retrieve data from one or more random non-promiscuous memory locations in which the authenticity of the data at the location is authenticated (e.g., a cryptogram, etc.).

Typically less sensitive data like manufacturer data, configuration data, and/or generic data may be stored in the public area of the non-promiscuous memory region. The private section of the non-promiscuous memory region contains data that is password protected. Not only must the data in the private section of the non-promiscuous memory region be asked for, but also the RFID device can require a valid password before the data in the private section is released. Data stored in the private section of the non-promiscuous region is typically more sensitive or confidential data like passcodes, passwords, authentication algorithms, keys, and the like.

In embodiments utilizing a "smart card" configuration, the memory of the RFID device may further comprise credential data. Credential data, i.e., promiscuous, non-promiscuous, and/or secured (not reader accessible) data, may be used by the RFID device to perform authentication functions that are typically performed by a host computer. Essentially, the credential data may relate to what assets the particular RFID device has access to and at what times the RFID device (or holder of the RFID device) may access those assets. In operation, the RFID device may be presented to a reader that relays back to the RFID device information relating to an asset associated with that reader and what time it is. While authenticating itself, the RFID device compares the asset and/or, if appropriate, the time information received from the reader with the credential data stored in its memory to determine if it has access rights to the given asset and, if appropriate, at the current time. If the RFID device does have access rights to that particular asset then the RFID device verifies its validity to the reader by emitting a valid signal. The valid signal may prompt to the reader to release the asset, which it was previously securing. For example, the reader may unlock a door, open a door, turn on a computer, etc. If the RFID device does not have access rights to that particular asset then the RFID device does not verify its validity to the reader and no further actions are taken or an invalid signal is sent to the reader. The invalid signal may prompt the reader to indicate to the holder of the RFID device that access is not permitted by, for example, flashing a light, emitting a sound, or creating some other type of message.

In another aspect of the invention, there is provided a method for authenticating the RFID devices and/or validating the readers using the inventive system. The method sequentially performs a series of steps of verifying the promiscuous data and a randomly selected portion of the non-promiscuous data of a RFID device being interrogated, as well as performance of the reader versus a matrix of pre-determined parameters. In one embodiment, the reader is invalidated as defective or compromised when the host computer detects that, during an interrogation routine, the reader made an algorithmic, computational, communicational, or tampered error. The reader and/or RFID device may also be invalidated as defective in the event that only promiscuous data is detected or read. The invention enables the system to stop unsophisticated attacks in which the attacker wrongfully assumed that the RFID devices/readers in use are legacy devices. Once a reader has been invalidated as defective, the reader may be disabled (e.g., the power supply to the reader is cut off, communications between the reader and the system are severed, etc.) When an RFID device has been invalidated as defective, the RFID device may be rejected by the system (e.g., denied access to an asset, marked as a bad RFID device, etc.) and/or disabled as well. An RFID device may be disabled by clearing the memory of the RFID device, disabling the communications interface of the RFID device, changing the communication protocol of the RFID device, and other methods known to those of skill in the art.

A reader makes an algorithmic error when it, for example, applies the wrong algorithm(s) to some data or does not know the proper algorithm(s) required to process some data. Alternatively, a reader makes a computational error when it misapplies the correct algorithm(s) to some data or otherwise improperly processes some data. A communicational error includes not using the proper frequency to communicate with the RFID device or asking for more data from the RFID device than should be asked for. A denial of service error occurs when someone is attempting to jam communications between a reader and an RFID device. Communications may be jammed when an attacker fills the space around the reader with signals of substantially the same frequency or harmonics that is used by the reader. The abundance of signals at the same frequency makes it difficult for the reader to communicate with any other device using RF signals. An attacker may attempt to jam signals of a particular frequency. When this sort of behavior is detected, the reader and/or RFID device can identify the problem and switch to another communication frequency that is not being jammed. A tampered error occurs when it can be determined that the reader has been tampered with.

A reader, in accordance with embodiments of the present invention, may be made indistinguishable from legacy readers upon first glance. A single reader utilizing the newer protocols described herein may be designed to look like a legacy reader. Utilizing this fact, a newer reader may be placed in a strategic location within the secure access system in order to ensnare attackers attempting to bypass the legacy readers. An attacker will not be able to easily determine what readers within the system are newer and what readers are legacy readers. Thus, when an attacker attempts to bypass the newer reader using bypass techniques designed for legacy readers, the attack will be detected.

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the appended drawings.

BRIEF DESCRIPTION OF THE DRAWINGS

The teachings of the present invention will become apparent by considering the following detailed description in conjunction with the accompanying drawings, in which.

To facilitate understanding, identical reference numerals are used, where possible, to designate identical elements that are common to the figures. The images in the drawings are simplified for illustrative purposes and are not depicted to scale.

The appended drawings illustrate exemplary embodiments of the invention and, as such, should not be considered as limiting the scope of the invention that may admit to other equally effective embodiments.

DETAILED DESCRIPTION

The present invention generally is a radio frequency identification (RFID) device and method for authenticating RFID devices, such as ID/access cards, smart cards, RF tags, and the like and/or readers of the RFID devices. The invention advantageously addresses deficiencies of the prior art and may be utilized within the context of security systems, as well as be equally efficiently utilized in a broad range of other applications using interactive computerized data acquisition techniques, both contactless or requiring a physical contact with a carrier of pre-programmed information (e.g., monitoring moving objects, tracking inventory, verifying credit cards, and the like).

Figure 1:
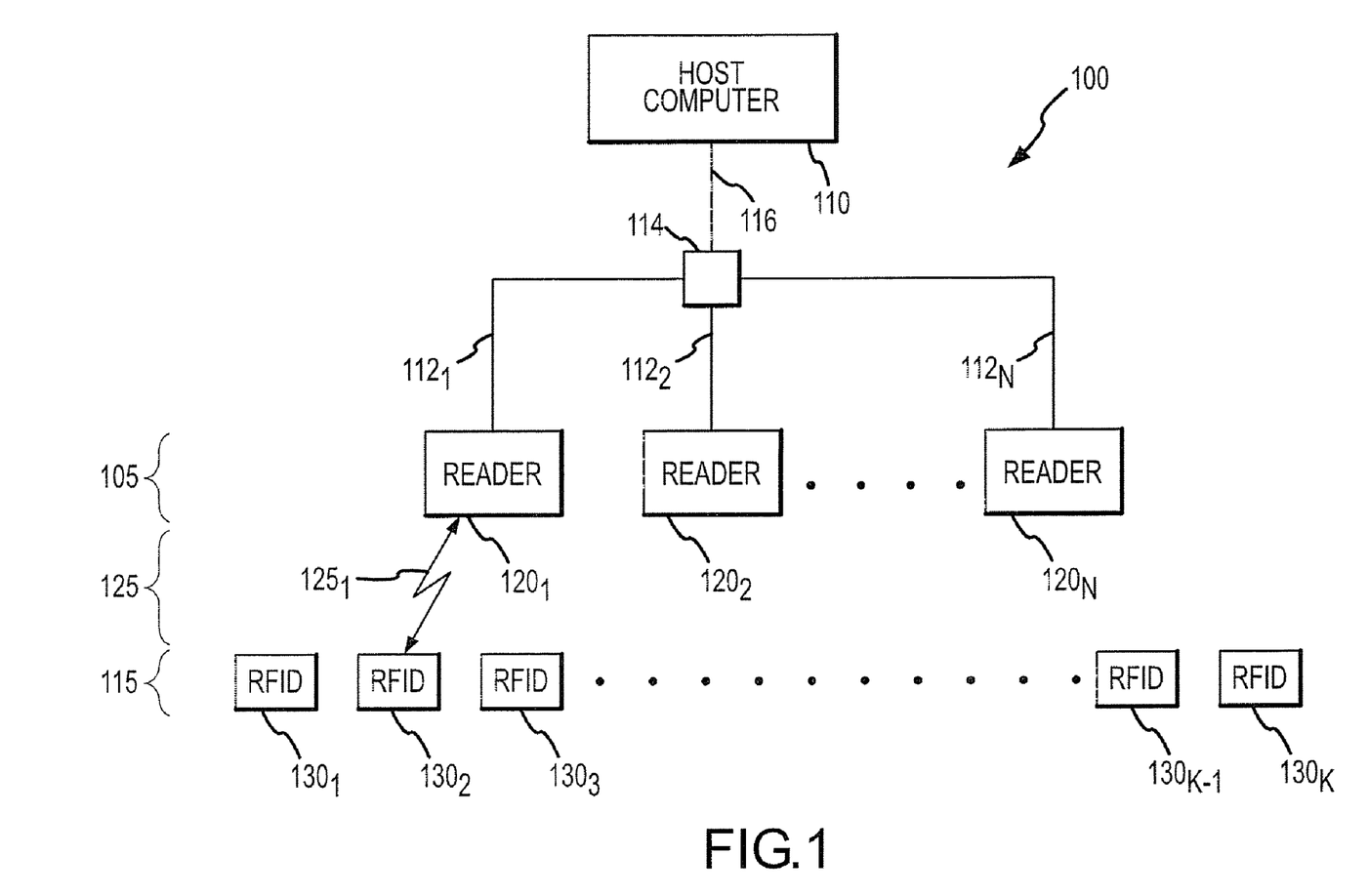
FIG. 1 depicts a high-level, schematic diagram of an exemplary system for authenticating RFIDs of the kind that may be used to practice portions of the invention.

FIG. 1 depicts a high-level, schematic diagram of an exemplary system 100 for authenticating RFID devices of the kind that may be used to practice portions of the invention. Hereafter, similar apparatuses, devices and interfaces are identified using the same numeric references, except that suffixes may be added, when appropriate, to differentiate such apparatuses, devices, and interfaces.

In one embodiment, the system 100 comprises a host computer 110, a plurality 115 of K RFID devices 130, and a plurality 105 of N readers 120 of the RFID devices 130. As used herein, N and K are integers wherein N≧1, K≧1, and typically K>N. The plurality of readers 105 may include readers 120 of the same type, as well as readers of different types or readers having different computing and/or interrogating capabilities. In the depicted embodiment, the readers 120 are coupled to the host computer 110 via an optional interconnecting hub 114. In an alternate embodiment (not shown), the readers 120 may directly be coupled to the respective I/O of the host computer 110. Interfaces 112 and 116 between the readers 120, the hub 114, and the host computer 110 are generally bidirectional interfaces, which may selectively be implemented in a form of wired, wireless, fiber-optic communication links, or combinations thereof. Even though the interfaces 112 and 116 are depicted as bidirectional interfaces, one of skill in art can appreciate that the interfaces 112 and 116 may be implemented with unidirectional interfaces that use a unidirectional communication protocol, for example, the Wiegand protocol.

As can be appreciated by one of skill in the art, the interfaces 112 and 116 may be implemented utilizing buses or other types of connections. For example, the I/O ports may be one or more of a USB port, parallel port, serial port, Small Computer Systems Interface (SCSI) port, modem, Ethernet, and/or an RF interface. The protocols used to communicate between the host computer 110 and the readers 120 may include one or more of the TCP/IP protocol, RS 232, RS 485, Current Loop, Power of Ethernet (POE), Bluetooth, Zigbee, GSM, WiFi, and other communication methods and protocols known in the art.

Bi-directional RF interfaces 125 between a reader 120 and a RFID device 130 are automatically established when the RFID device is placed in an active zone (not shown) of the interrogating reader (RF interface $125_1$ between the reader $120_1$ and RFID device $130_2$ is illustratively shown). Herein the active zone of the reader 120 is defined as a three dimensional space where intensity of RF signals emitted by the reader exceeds a threshold of sensitivity of the RFID device 130 and intensity of RF signals emitted by the RFID device 130 exceeds a threshold of sensitivity of the reader 120.

The host computer 110 may be a general-purpose computer adapted for multi-task data processing and suitable for use in an industrial setting. Functions of the host computer 110 may alternatively be implemented in a control panel that employs various sub-panels corresponding to different sets of readers. Each sub-panel is responsible for the various readers connected thereto, and a determination of authenticity may be made at the sub-panel rather than the host computer. A memory of the host computer 110 (or control panel) comprises software program(s) containing at least one of a database of records associated with the readers 120, the RFID devices 130 and their respective holders or users, algorithms(s) for acquiring, decoding, verifying, and modifying data contained in the RFID devices 130, algorithm(s) for testing authenticity and validity of the readers 120 and RFID devices 130, and algorithm(s) for implementing the results of these tests. Specific configuration of the host computer 110 is determined based on and compliant with computing and interfacing capabilities of the readers 120.

As used herein, reference to an individual or an object associated with the RFID device 130, the terms a "holder" and a "user" are used interchangeably.

Each reader 120 is adapted for exchanging information with the host computer 110 and for requesting data from the RFID device 130 placed in the active zone of the reader. The reader 120 may also be adapted for processing at least a portion of the data acquired from the RFID device 130. Alternatively, processing of the acquired data may be performed using the host computer 110. In one embodiment, the reader 120 generates signals facilitating execution of the results of interrogating the RFID device (e.g., engages/disengages a locking mechanism, allows/disallows movement of a monitored article, temporarily disables itself, activates an alarm system, and the like). Alternatively, the host computer 110 may generate such signals.

In accordance with embodiments of the present invention, a stand-alone reader 120, which includes the functionality of both the reader 120 and the host computer 110, may be utilized. This stand-alone reader may include, or have access to, the database that contains data used to determine the authenticity of an RFID device and/or algorithm(s) used to make the determination of authenticity of the RFID device. A determination of authenticity for an RFID device is made at the receiving point rather than having to transmit data across a network from the reader to a host computer 110/control panel in order to make a determination of authenticity. The stand-alone reader is further operable to execute instructions based upon the analysis of the RFID device.

Figure 2:
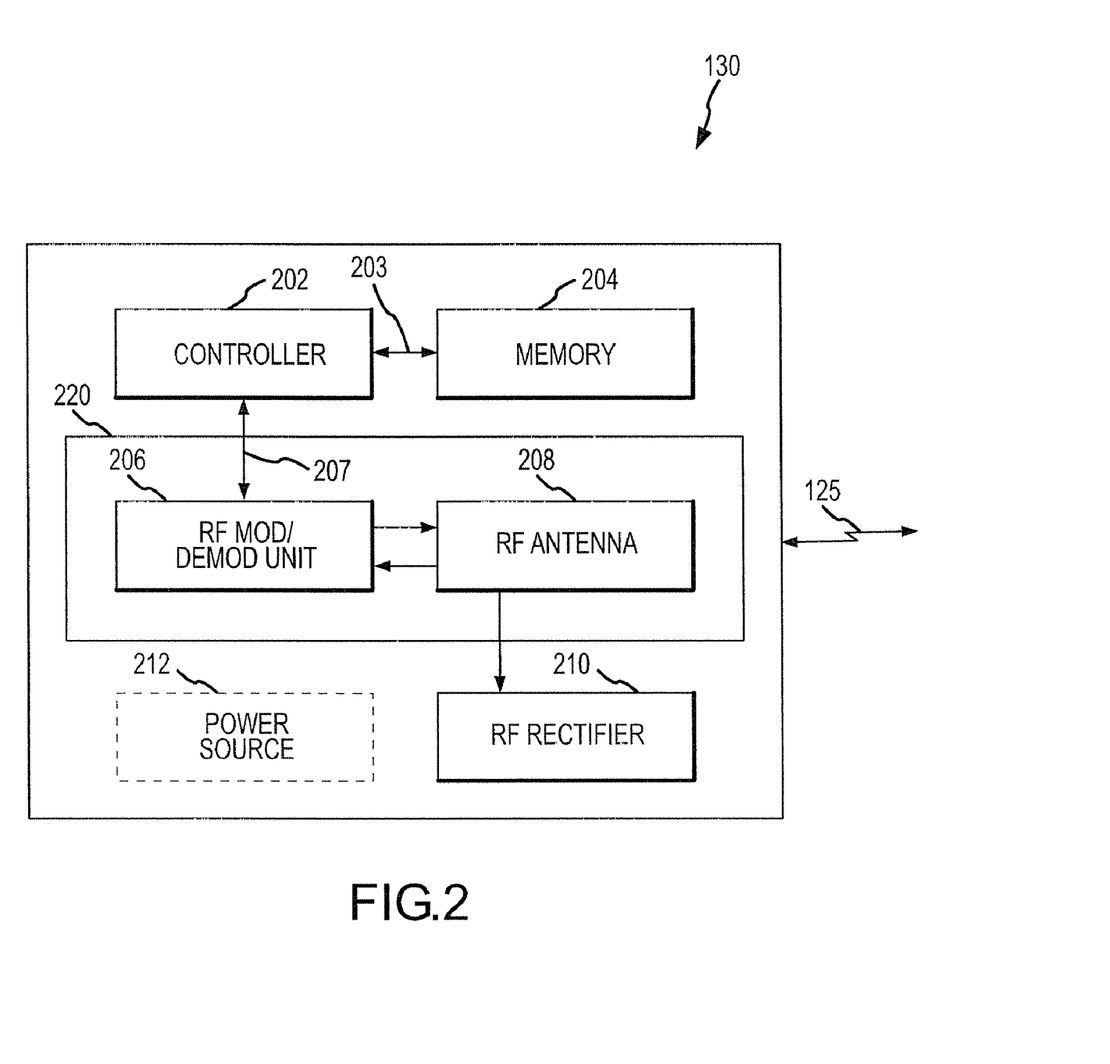
FIG. 2 depicts a high-level, exemplary schematic diagram of an RFID device of the system of FIG. 1.

FIG. 2 depicts a high-level, exemplary schematic diagram of the RFID device 130 in accordance with one embodiment of the present invention. In the depicted embodiment, the RFID device 130 illustratively comprises a controller 202, a memory 204, a RF receiver/transmitter 220 including a RF modulator/demodulator unit (MDU) 206 and a RF antenna 208, an optional RF rectifier 210, and/or an optional power supply 212. The controller 202 (e.g., application specific integrated circuit (ASIC), microprocessor, programmable controller, and the like) uses bi-directional interfaces 203 and 207 to the memory 204 and MDU 206, respectively, to facilitate data exchanges in the RFID 130 and wireless communications with an interrogating reader (e.g., reader $120_2$ of FIG. 1). In an alternate embodiment (not shown), at least portions of the MDU 206 may be incorporated in the controller 202.

The RFID device 130 may be fabricated as a system-on-chip (SoC) device, a system-in-package (SiP) device, or a system-in-module (SiM) device. In the SoC device, various functional components are integrated onto a single die. Accordingly, in SiP and SiM devices, several SoC devices are combined in a single package (SiP device) or an assembly including SoC and/or SiP devices (SiM device), respectively.

A "passive" RFID device 130 uses RF signals (i.e., RF radiation) emitted by the reader 120 as a source of energy for powering the RFID device. When a passive RFID device comes within range of an interrogating reader, the reader provides power to the RFID device via a querying RF signal. The passive RFID device 130 comprises the RF rectifier 210 (as shown in FIG. 2) converting a portion of RF power collected by the antenna 208 in the DC power facilitating operability of the RFID device. Such a RFID device can operate only in the active zone of an interrogating reader and is inactive otherwise.

Alternatively, the RFID device 130 may comprise the internal (i.e., on-board) power source 212, such as one or several batteries and/or solar cells ("active" RFID device). In yet another embodiment, the RFID device 130 comprises both the RF rectifier 210 and the power source 212 ("semi-active" RFID device). Active and semi-active RFID devices can typically be used at greater distances from the readers than the passive ones, as well may be provided with additional computing and/or sensing capabilities.

In operation, the reader 120 and RFID device 130 use pre-programmed communication protocols. To increase probability of error-free reception, the same messages may redundantly be repeated a pre-determined number of times or during a pre-determined time interval. The interrogating reader 120 generates an interrogating RF signal. The interrogating RF signal of the interrogating reader 120 (or, in passive or semi-passive RFID devices, a portion of that signal) is received by the RFID antenna 208 and is forwarded to the MDU 206 that demodulates the RF signal and provides the demodulated signal for processing to the controller 202. When the received RF signal contains a request for data identifying the RFID device 130 and/or a holder of the RFID device, the controller accesses the memory 204 for this data and, via the MDU 206 and antenna 208, transfers the requested data to the reader 120.

Figure 4:
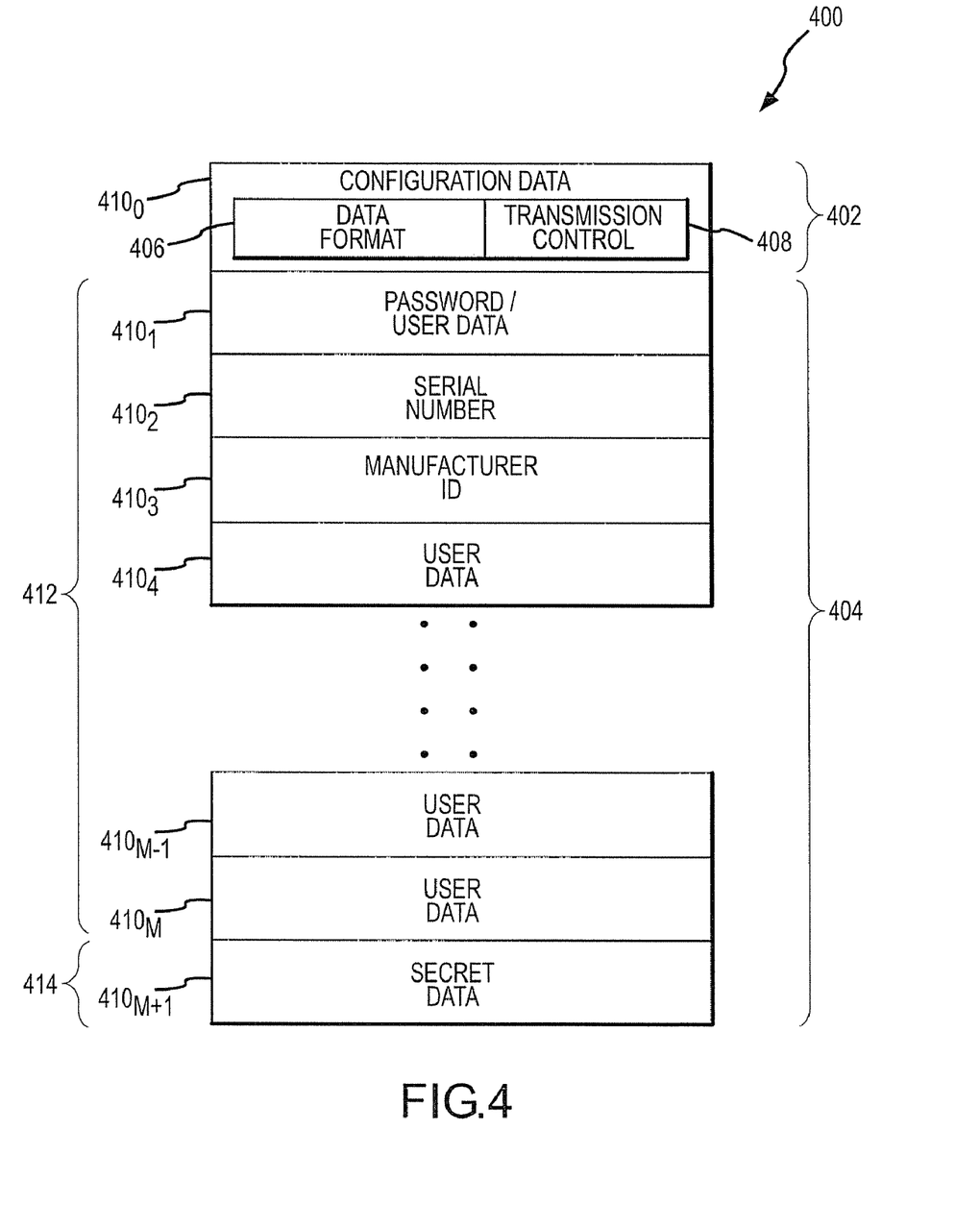
FIG. 4 depicts an exemplary memory map of an RFID device of FIG. 1 in accordance with one embodiment of the present invention.

The memory 204 (as can be seen in FIG. 4) generally comprises a promiscuous region 402 and a non-promiscuous region 404. The promiscuous region 402 contains commonly formatted information including general data such as manufacturer data, configuration data, and the like. The non-promiscuous region 404 may contain shared-secret data, authentication data of the RFID device 130 and any other holder-specific data. Data is stored in the regions 402 and 404 of the memory in a form of data segments 410 (discussed in detail in reference to FIGS. 4-5). Data stored in the promiscuous region 402 ("promiscuous data") is automatically transmitted to the interrogating reader 120 when the controller 202 detects a querying RF signal of the reader (i.e., when the RFID device 130 is disposed in the active zone of that reader). Data stored in the non-promiscuous region 404 ("non-promiscuous data") is selectively transmitted to the interrogating reader upon an additional request from the reader, otherwise known as challenges. Initiation and execution of such a request sometimes requires successful decoding and validation of the promiscuous data by the interrogating reader 120 and/or the host computer 110.

The memory 204 of a passive RFID device generally comprises at least one array of non-volatile memory cells, e.g., Erasable Programmable Read Only Memory (EPROM) cells or FLASH memory cells, among other types of non-volatile memory cells. The memory 204 of an active RFID device having a battery may additionally comprise at least one array of dynamic random access memory (DRAM) cells. A content of at least a portion of the memory 204 may be pre-programmed and write-protected thereafter, whereas the content of other portions of the memory may selectively be modified or erased using the reader 120.

In accordance with embodiments of the present invention, the memory 204 may further comprise credential data $410_{M+1}$ and authenticating functions. Examples of credential data $410_{M+1}$ include, but are not limited to, assets the RFID device 130 has access to, times of allowed access to each asset, and other data that can help the RFID device 130 determine if it is eligible to gain access to a particular asset. The authenticating functions use the credential data $410_{M+1}$, to enable the RFID device 130 to make a determination of its own access rights with respect to an asset.

An RFID device 130 that determines and enforces its own access rights and permissions is typically referred to as a smart card, however a proximity card may also perform such functions. In operation, a "smart" RFID device 130 is presented to a reader 120. The reader 120 is associated with one or more assets and the reader 120 is the gatekeeper of those assets. The reader 120 contains information about its associated assets and usually time of day information. Upon presentation of the RFID device 130 to the reader 120, the reader 120 supplies the asset information and time of day information to the RFID device 130. The RFID device 130 then analyzes the asset information and time of day information using its credential data $410_{M+1}$. The RFID device 130 then makes a determination whether it is allowed to access the given asset (e.g., whether the holder of the RFID device 130 can have access to a room behind a door, a bank account, computer files, etc.) If the RFID device 130 determines that it is allowed access to the particular asset, then it sends a signal back to the reader 120 indicating that validation of the RFID device 130 has been confirmed and access should be granted. Upon confirmation of validation of the RFID device 130, the reader 120 will unlock the door, access the bank account, permit access to the computer files, or perform the requisite steps to grant access to the holder of the RFID. If the RFID device 130 determines that it is not allowed access to the particular asset, then it can either do nothing or send a signal back to the reader 120 indicating that validation of the RFID device 130 was not confirmed and access should not be granted. Upon the receipt of this signal, the reader 120 may perform no action, generate a message indicating that access was not granted, sound an alarm, or perform some other sort of action in accordance with denying the holder of the RFID device 130 access to the asset.

Figure 3:
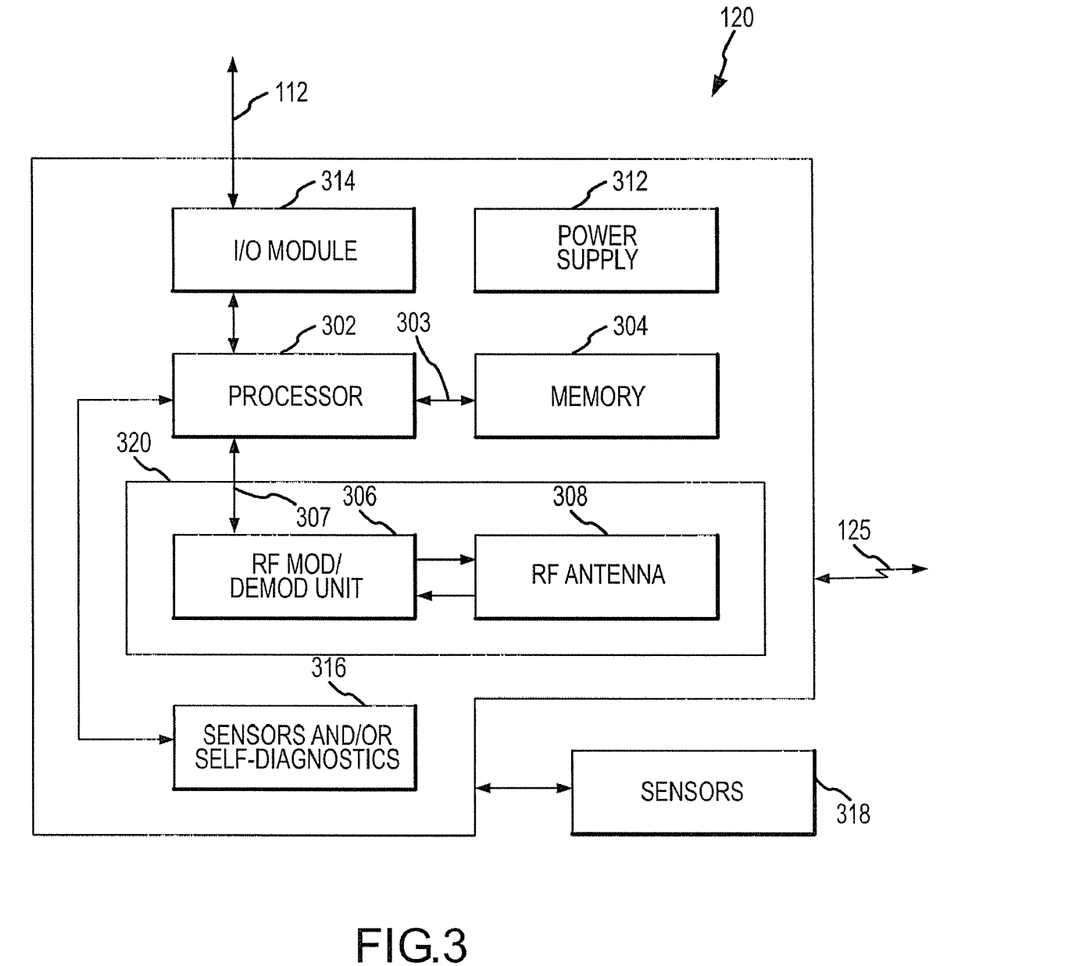
FIG. 3 depicts a high-level, exemplary schematic diagram of a reader of the system of FIG. 1.

FIG. 3 depicts a high-level, exemplary schematic diagram of the reader 120 of the system of FIG. 1 in accordance with one embodiment of the present invention. In the depicted embodiment, the reader 120 illustratively comprises one or more processors 302, a memory 304, a RF receiver/transmitter 320 including a RF modulator/demodulator unit (MDU) 306 and a RF antenna 308, an input/output (I/O) module 314 coupling the reader to the host computer 110, an internal means 316 for self-diagnostics and detecting attempts of tampering the reader, external sensors 318 for detecting such attempts, and a power supply 312. Similar to the RFID 130, the reader 120 or portions thereof may be fabricated as a SoC, SiP, SiM device, or other discrete electronic components.

The processor 302 (e.g., microprocessor, application specific integrated circuit (ASIC), and the like) uses bi-directional interfaces 303 and 307 to the memory 304 and MDU 306 for facilitating data processing in the reader and establishing wireless communications with the RFID device being interrogated by the reader (e.g., RFID device $130_2$ of FIG. 1). In an alternate embodiment (not shown), at least portions of the MDU 306 may be incorporated in the processor 302. The memory 304 generally comprises software routines facilitating, in operation, pre-determined functionality of the reader 120. The memory 304 may be implemented using various types of electronic memory discussed above in reference to FIG. 2 and/or magnetic or optical memory (e.g., hard drive, optical drive, floppy disk, and the like). The reader's internal sensors and/or self-diagnostics 316 and external sensors 318, collectively, comprise sensors adapted for detecting attempts of compromising integrity the reader (e.g., mechanically, electronically, or otherwise), as well as door monitoring sensors, latch monitoring sensors, egress buttons, and so on.

A reader 120 may also be implemented as a stand-alone reader. A stand-alone reader usually performs the functions of both a reader 120 and a host computer 110 using the same or additional controllers 302. The memory 304 available to a stand-alone reader also comprises authentication verification information. Thus, the reader 120 does not have to ask any remote device in the system 100 for help in validating, or invalidating, an RFID device 130 presented thereto. Typically, all of the components are located within the same unit or housing. Upon verification of the validity of an RFID device 130, the reader is further operable to initiate actions that allow the holder of the RFID device 130 access to an asset associated with the reader 120. Likewise, upon determining that the RFID device 130 is invalid or not permitted to access a particular asset, the reader 120 can initiate and perform actions concurrent with such a determination.

FIG. 4 depicts an exemplary memory map 400 of the memory 204 in accordance with one embodiment of the present invention. In the depicted embodiment, the memory map 400 comprises a plurality of M data segments (or "words") 410 each having a pre-determined bit length, wherein M is an integer and $M \geq 2$.

Illustratively, a data segment $410_0$ contains configuration data of the memory map 400, data segments $410_1$, $410_2$, and $410_3$ contain a password, a Unique ID (UID) of the RFID device 130, and a Manufacturer ID (MID) of the RFID device 130, respectively, and data segments $410_4$-$410_M$ contain user/holder data. Additional data that may be stored in memory can include site codes and the like.

In one embodiment, the UID is a serial number (SN) of the RFID device 130, the MID is a number or name assigned to a group of RFID devices (e.g., RFID devices fabricated for the same customer, RFID devices fabricated for use within certain area, and the like), and the user data is user credential data such as user name, employee badge number, and the like. In an alternate embodiment, at least one of the data segments $410_1$, $410_2$, or $410_3$ may contain the user data. The data segments $410_1$-$410_3$ and one or more adjacent data segments $410_4$-$410_M$ may be associated with the non-promiscuous region 404 of the memory 204. In the depicted embodiment, the data segment $410_0$ illustratively belongs to the promiscuous region 402. Alternatively, the data segment $410_0$ may be a portion of the non-promiscuous region 404. Furthermore, general data that is shown associated with the non-promiscuous region 404 may be a part of the promiscuous region 402. For example, the MID is a number or name that is commonly associated with a number of other RFID devices. As such, the MID in data segment $410_3$ may belong to the promiscuous region 402 instead of the non-promiscuous region 404. Also, more data segments may be associated with the promiscuous region 402 instead of the non-promiscuous region 404, such as site codes and the like. Other credential data that is not related to the secret data stored in the non-promiscuous region 404 may be stored on the promiscuous region 402. For instance, credential data for one building may be stored on the promiscuous region 402 and credential data for a second building may be stored on the non-promiscuous region 404.

In the RFID device 130, the data segment $410_0$ comprises a data format block 406 and a transmission control block 408. The data format block 406 contains information describing the organization of the memory 204 (e.g., size of the memory, a number and bit lengths of the data segments, and the like). The transmission control block 408 contains a code identifying the data segments associated with the promiscuous region 402. In one exemplary embodiment, a numeric value of the code (i.e., a max block code) corresponds to a number of data segments adjacent to the data segment $410_0$. For example, when the numeric value of the code is 4, the promiscuous region 402 includes the data segments $410_0$-$410_3$, while the non-promiscuous region 404 comprises the data segments $410_4$-$410_M$.

The non-promiscuous region 404 may further be divided into public 412 and private 414 sections. In order for an interrogating reader 120 to gain access to data stored in the private section 414 of the non-promiscuous region 404, the reader 120 issues a password along with the challenge. The RFID device 130 receives the challenge along with the password, then analyzes the password to determine whether it is a valid password or not. If the password is valid for the piece of data that is requested by the reader 120, then the RFID device 130 releases the requested data from the private section 414 and subsequently transmits the requested data to a reader 120. Data stored in the private section 414 of the non-promiscuous memory region 404 is typically relatively sensitive data like passwords, social security numbers, keys, PIN codes, and other types of shared-secret data. The RFID device 130 requires a valid password and/or authentication before it allows any reader 120 to read data from the private section 414.

The public section 412 of the non-promiscuous memory region 404 typically contains less sensitive data than the private section 414, although it can contain data with a higher degree of sensitivity. Examples of types of data that may be store on the public section 412 include, but are not limited to, manufacturer data, a reference ID, site code, card unique ID, and other types of manufacturer, user, and/or configuration data. In order for a reader 120 to gain access to data stored on the public section 412 the reader 120 only needs to request (or challenge) the RFID device 130 for the information. If the requested information resides in the public section 412, then no password verification needs to be performed and the data is transmitted back to the reader 120.

Figure 5:
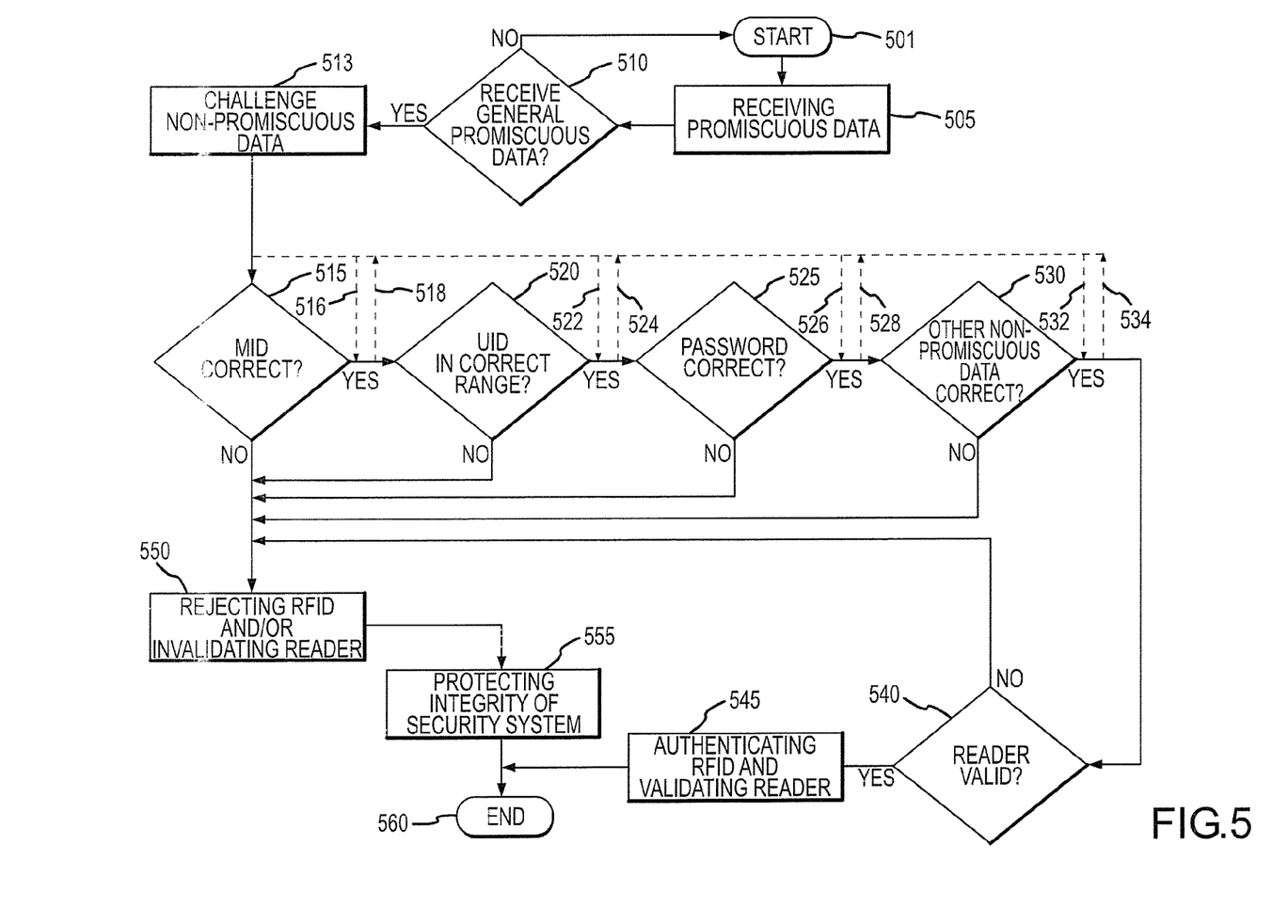
FIG. 5 depicts a flow diagram illustrating a method for authenticating RFID devices using the system of FIG. 1 in accordance with one embodiment of the present invention.

FIG. 5 depicts a flow diagram illustrating a method for authenticating the RFID devices 130 using the system of FIG. 1 in accordance with one embodiment of the present invention. In some embodiments, processing steps of the method are performed in the depicted order. In alternate embodiments, at least two of these steps may be performed contemporaneously or in a different order. To best understand the invention, the reader should simultaneously refer to FIGS. 1 and 4-5.

The method starts at step 501 and proceeds to step 505, where an interrogating reader 120 (e.g., reader $120_1$) receives a data stream from the RFID device 130 (e.g., RFID device $130_2$), which entered an active zone of the reader. The received data stream comprises a sequence of repetitive messages each containing a content of the data segments associated with the promiscuous region 402 of the memory 204 of that RFID device. The number of data segments received from the promiscuous region 402 may be determined by a max code identifier. The reader accumulates a statistically significant number of the messages (e.g., 3-10 or more) to facilitate an error-free interpretation of the received data. Using computing capabilities of the reader 120 and/or the host computer 110, portions corresponding to the MID, other general data, and contents of individual data segments are recognized. When the messages are encrypted, using the encryption key located in the respective data segment(s), the reader 120, or the host computer 110, the encrypted data is decoded, as discussed above in reference to FIG. 4.

At step 510, the method queries if a content of the received data stream indicates that the RFID device being interrogated contains general or generic promiscuous data. If the query of step 510 is negatively answered, the method returns to step 501 to wait for more promiscuous data. In an alternative embodiment, if the query is negatively answered, the method may proceed to step 550 where the RFID device is rejected and the holder of the RFID device is denied the requested privileges. If the query of step 510 is affirmatively answered, (e.g., the RFID device contains only general or generic data promiscuous data), the method proceeds to step 513.

At step 513, the interrogating reader 120 interactively communicates to the RFID device 130 (e.g., begins issuing challenges to the RFID device). Specifically, the reader 120 requests and receives from the RFID device 130 a content of one or more randomly selected data segments 410 associated with the non-promiscuous region 404 of the memory 204 of the RFID device. For the request to be accepted and executed by the RFID device 130, the reader transmits to the RFID device a pre-determined message. In one embodiment, such a message comprises the password to be validated at step 525, as well as identifiers of the requested data segments.

As noted above, in order to gain access to data stored in the private section 414 of the non-promiscuous region 404 of memory, the reader 120 presents a valid password to the RFID device 130 along with the challenge. In order to gain access to data stored in the public section 412 of the non-promiscuous region 404, the reader 120 submits the challenge requesting the data. When a reader 120 requests public data 412, the RFID device 130 will readily transmit a message containing that data back to the reader 120. However, prior to transmitting a message containing private data 414 back to a reader 120, the RFID device 130 will analyze the received password to determine if the reader 120 has access rights to the requested private data 414.

One or more data elements, such as the MID, the UID, shared-secret data such as the password, a key, or a specific portion of the user data may be absent in the received non-promiscuous data stream, however, the data stream always comprises at least one of these data elements. When the reader or the host computer 110 detects absence of a respective data element, the method skips a query examining the validity of that element, as illustratively shown in FIG. 5 using optional links 516 and 518, 522 and 524, 526 and 528, and 532 and 534.

For example, when the MID data is absent, but the UID data is present, the method after step 513 proceeds to step 520 (link 516), thus skipping step 515. Correspondingly, if a query of step 520 is affirmatively answered and the password data is absent, the method after step 520 proceeds to step 530 (links 524 and 526), thus skipping step 525. Herein, for a purpose of completeness, we assume that the MID, UID, password, and a portion of the user data are present in the promiscuous data stream 404 received from the RFID device being interrogated.

At step 515, the method queries if the MID provided by the RFID device 130 being interrogated is correct (i.e., matches the records). If the query of step 515 is negatively answered, the method proceeds to step 550. If the query of step 515 is affirmatively answered, the method proceeds to step 520.

At step 520, the method queries if the UID provided by the RFID device 130 being interrogated is correct. When the UID is a serial number, the method may, for example, verify that the provided serial number belongs to a pre-selected range assigned to the serial numbers. If the query of step 520 is negatively answered, the method proceeds to step 550. If the query of step 520 is affirmatively answered, the method proceeds to step 525.

At step 525, the method queries if the password provided by the RFID device 130 being interrogated is correct (e.g., pre-determined alpha-numeric sequence, result of solving a pre-defined logical or mathematical equation, and the like). If the query of step 525 is negatively answered, the method proceeds to step 550. If the query of step 525 is affirmatively answered, the method proceeds to step 530.

At step 530, the method queries if the portion of the user data provided by the RFID device 130 being interrogated matches the records (e.g., user name, user affiliation, and the like). If the query of step 530 is negatively answered, the method proceeds to step 550. If the query of step 530 is affirmatively answered, the method proceeds to step 530. At this point if the reader needs to issue any more additional challenges to the RFID device to authenticate it, then the reader does so. Once a suitable number of challenges have been correctly answered by the RFID device, the method continues to step 540. As can be appreciated, the number of challenges may be fixed or may be a random number.

At step 540, the method queries if the reader maintains its integrity, e.g., to determine if the reader is defective or compromised. In one embodiment, the host computer 100 selectively analyzes for algorithmic, computational, communicational, or tampered behavior errors of the reader. A matrix of specific test criteria may include, among other controlled parameters, at least one of (a) a failure of the reader to detect an attempt of tampering the reader, (b) an error the reader made executing a self-diagnostic routine; (c) an error in a message the reader communicates to the RFID device 130 being interrogated and/or the host computer 110, (d) the reader fails to request the non-promiscuous data, (e) an error the reader made analyzing at least a portion of the data received from the RFID device, (f) the reader interrogates the RFID device for duration of time smaller than a first pre-determined time interval, or (g) the reader interrogates the RFID device for duration of time greater than a second pre-determined time interval. If the query of step 542 is negatively answered, the method proceeds to step 550. If the query of step 540 is affirmatively answered, the method proceeds to step 545.

At step 545, the reader 120 is validated by the host computer 110 and authorized to authenticate the RFID device 130 being interrogated and provide a holder of the RFID device with privileges listed in the RFID device or records stored in or otherwise available to the reader 120 or the host computer 110.

At step 550, the RFID device 130 that failed at least one of the validity tests discussed above in reference to steps 515, 520, 525, 530, and 540 is rejected as invalid and, as such, a holder of the RFID device is denied any privileges the holder of an authenticated RFID device could be entitled to. Additionally, the reader 120 determined to be defective or compromised for any reason discussed above in reference to steps 510 and 542, is disabled until repaired or replaced with a valid reader.

At step 555, to protect integrity of the system 100, the reader 120 or the host computer 110 analyses a number and pattern of events associated with interrogation of invalid RFID devices. In one embodiment, the host computer disables the reader 120 or otherwise terminates authentication of the RFID devices 130 by the reader for a pre-determined duration of time or permanently and/or generates a corresponding alarm signal when at least one of the following events is detected: (a) a number of invalid RFID devices interrogated during a specific time interval exceeds a first predetermined threshold, (b) a number of consecutively interrogated invalid RFID devices exceeds a second predetermined threshold, (c) a number of repetitive interrogations of the same invalid RFID device(s) exceeds a third pre-determined threshold, (d) a denial of service attack or error due to detected signal jamming attempts, or (e) an attempt to tamper with the reader mechanically or electronically, including an attempt to tamper with software of the reader. In an alternate embodiment, at least the reader may perform a portion of these measures. In another embodiment, using the interrogating reader 120, a content of one or more data segments 410 in an invalid RFID device may selectively be modified or erased to prevent further attempts to authenticate that RFID device. In one embodiment, after being disabled, the reader may be re-enabled using at least one of the host computer, a built-in keypad, or a pre-programmed transferable device, said device using a means of electrical, magnetic, optical, or radio frequency coupling to the reader. At step 560, upon completion of step 545 or step 555, the method ends.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations, and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An access control system, comprising:
   (a) one or more radio frequency identification (RFID) devices, each RFID device including a memory comprising promiscuous and non-promiscuous regions,
      (i) said promiscuous region including data comprising at least one of manufacturer data, configuration data and general non-secure data;
      (ii) said non-promiscuous region including at least one of manufacturer data, configuration data, shared-secret data and holder data;
   (b) one or more radio frequency (RF) interrogators (readers), said readers transmitting an RF signal to create an active RF zone around said readers; and
   wherein, when an RFID device is positioned in an active zone of a reader, data stored in the promiscuous region is first transmitted from the RFID device to the reader in response to the RFID device being excited by the RF signal transmitted by the reader and in the absence of receiving a request for data command from the reader, data from the non-promiscuous region is randomly selected by the reader and selectively transmitted to the reader only upon a challenge initiated by the reader for data from a random non-promiscuous memory location, wherein the challenge comprises a series of challenges each of which identify a different randomly selected memory segment in the non-promiscuous region.

2. The access control system of claim 1, wherein the reader decodes and validates the transmitted promiscuous data prior to randomly selecting and requesting transmission of non-promiscuous data.

3. The access control system of claim 2, wherein the reader requests particular but randomly selected non-promiscuous data from the RFID device via a challenge only in the event that general promiscuous data is received from the promiscuous region.

4. The access control system of claim 3, wherein the reader further transmits data to a host computer system only upon the reader receiving said particular non-promiscuous data.

5. The access control system of claim 3, wherein at least one of a host computer system and the reader invalidates the RFID device when said particular non-promiscuous data is not received from the RFID device.

6. The access control system of claim 1, wherein the RFID device stores credential data for a first facility in the promiscuous region, said first facility having a first host computer system, and stores credential data for a second facility in the non-promiscuous region, said second facility having a second host computer system.

7. The access control system of claim 6, wherein the first and second host computer systems are the same.

8. The access control system of claim 1, wherein said non-promiscuous region is separated into a public section that includes data that is transmitted to said reader upon a request initiated by said reader and a private section that includes data that is transmitted to said reader only upon a request initiated by said reader that includes a valid password.

9. A method for validating components in an access control system, comprising:
   (a) providing a population of radio frequency identification (RFID) devices, said RFID devices including a memory comprising promiscuous and non-promiscuous regions, and at least one radio frequency (RF) interrogator (reader), wherein said promiscuous region includes data that is common across two or more RFID devices in the population of RFID devices and the data comprises at least one of manufacturer data, configuration data and general non-secure data and said non-promiscuous region includes data comprising at least one of configuration data, shared-secret data and holder data;
   (b) said at least one reader transmitting an RF signal to create an active RF zone around said at least one reader;
   (c) positioning at least one RFID device into said active zone;
   (d) in response to positioning said at least one RFID device into said active zone and in the absence of a challenge for data, detecting, by said reader, data stored in said promiscuous region of said at least one RFID device;
   (e) determining contents of said detected data correspond to at least one of said manufacturer data, configuration data, and general non-secure data;
   (f) requesting, via a first challenge initiated by the reader, a first portion of random data from the non-promiscuous region of the RFID device, wherein the first portion of random data is selectively requested of the RFID device by the reader; and
   (g) requesting, via a second challenge initiated by the reader, a second portion of random data from the non-promiscuous region of the RFID device, wherein the second portion of random data is selectively requested of the RFID device by the reader.

10. The method of claim 9, further comprising selectively and sequentially transmitting additional challenges relating to said random data stored on said non-promiscuous region of said at least one RFID device and receiving data responses from said at least one RFID device in response to transmitting said additional challenges.

11. The method of claim 10, further comprising decoding and validating said detected data stored in said promiscuous region by said reader prior to said reader transmitting said challenges.

12. The method of claim 11, further comprising requesting particular but randomly selected non-promiscuous data from said at least one RFID device in the event that generic promiscuous data is received.

13. The method of claim 12, further comprising transmitting data from said reader to a host computer upon receiving said particular non-promiscuous data.

14. The method of claim 8, further comprising storing credential data for a first facility in said promiscuous region, said first facility having a first host computer system, and storing credential data for a second facility in said non-promiscuous region, said second facility having a second host computer system.

15. A radio frequency identification (RFID) device, comprising:
    an antenna for communicating with a radio frequency (RF) enabled interrogator;
    a memory comprising:
    a promiscuous region comprising general non-secure data; and
    a non-promiscuous region comprising at least one of manufacturer data, configuration data, shared-secret data, and holder data; and
    wherein data from the promiscuous region is promiscuously transmitted by the RFID device to the reader when the RFID device is disposed in an active zone of the reader and in the absence of the reader sending a request for data command to the RFID device, and wherein data from said non-promiscuous region is randomly accessible and selectively transmitted to an RF enabled device only upon a request initiated by said RF enabled device, wherein the request initiated by the RF enabled device comprises a series of requests each of which identifies a different segment of the non-promiscuous region randomly selected to be challenged by the RF enabled device.

16. The RFID device of claim 15, wherein data from said promiscuous region is transmitted prior to data from said non-promiscuous region.

17. The RFID device of claim 16, wherein said RFID device comprises a proximity card.

18. The RFID device of claim 15, wherein a maximum block code identifier defines the amount of promiscuous data transmitted from the promiscuous region.

19. The RFID device of claim 15, wherein said non-promiscuous region comprises public data that is transmitted upon receipt of a request and private data that is transmitted upon receipt of a request and a password and upon validation of said password.

20. The RFID device of claim 15, wherein said memory further comprises credential data and wherein said credential data is used by said RFID device to determine access rights of said RFID device.

21. The RFID device of claim 20, wherein said RFID device transmits a confirmation of validation signal to an RF enabled device in response to the RFID device determining that said access rights of said RFID device for an asset are granted.

22. The RFID device of claim 20, wherein said RFID device transmits a non-confirmation of validation signal to an RF enabled device in response to the RFID device determining that said access rights of said RFID device for an asset are not granted.

23. The RFID device of claim 15, wherein a content of the data stored in the non-promiscuous region is stored in a cryptographic format.

24. The RFID device of claim 23, wherein an encryption key for said cryptographic format is encoded in a content of at least one data segment associated with the non-promiscuous region.

25. The RFID device of claim 15, wherein a number of data segments selectively associated with said promiscuous region are encoded with said general non-secure data.

26. The RFID device of claim 15, wherein data stored in at least one of said promiscuous and non-promiscuous region is stored in a read-only portion of said memory.

27. The RFID device of claim 15, wherein data stored in at least one of said promiscuous and non-promiscuous region is stored in a read/write portion of said memory.

28. The RFID device of claim 15, wherein said RFID device comprises at least one of an access card, an ID card, a cellular phone, a Personal Digital Assistant (PDA) and an RF tag.

29. The RFID device of claim 15, wherein said RFID device comprises a smart card.

30. The RFID device of claim 15, wherein the general non-secure data is common between the RFID device and at least one other RFID device.

* * * * *